United States Patent

[11] 3,626,810

[72] Inventor Carl Morey
Cincinnati, Ohio
[21] Appl. No. 792,360
[22] Filed Jan. 21, 1969
[45] Patented Dec. 14, 1971
[73] Assignee Silent Hydropower, Inc.
Mariemont, Ohio

[54] VARIABLE REVERSIBLE PISTON PUMP
31 Claims, 9 Drawing Figs.

[52] U.S. Cl. ................................................ 91/486,
91/492, 91/497
[51] Int. Cl. .................................................. F04b 1/10,
F04b 49/08
[50] Field of Search ........................................ 103/161,
162; 230/177; 91/199–205; 92/56

[56] References Cited
UNITED STATES PATENTS

| 2,025,758 | 12/1935 | Long | 103/161 |
| 2,164,888 | 7/1939 | Sasen et al. | 103/161 |
| 2,458,985 | 1/1949 | Ferris et al. | 103/161 |
| 2,617,360 | 11/1952 | Barker | 103/162 |
| 2,711,724 | 6/1955 | Jenny | 103/162 |
| 2,871,797 | 2/1959 | Bourassa et al. | 103/161 |
| 2,945,451 | 7/1960 | Griswold | 103/174 |
| 3,036,528 | 5/1962 | Klopp | 103/161 |
| 3,398,698 | 8/1968 | Eickmann | 103/161 |
| 3,357,362 | 12/1967 | Orr | 103/161 |

FOREIGN PATENTS

| 1,258,162 | 2/1961 | France | 103/162 |
| 1,377,927 | 9/1964 | France | 103/161 |
| 574,991 | 1/1946 | Great Britain | 103/161 |

Primary Examiner—William L. Free
Attorney—J. Warren Kinney, Jr.

ABSTRACT: The pump is of the variable displacement, reversible flow, positive displacement, radial piston type, characterized by a single rotatable part or rotor which carries a group of pistons; the pistons being reciprocated progressively by means of cam members or eccentric rings which, though adjustable, are always restrained against rotation; and the flow of fluid generated by the piston movements being controlled by one or more valve members or blocks fixed against rotation within the housing. The valve member or block has no moving parts, and controls flow of fluid through simple traveling ports in the rotor.

Patented Dec. 14, 1971

INVENTOR
CARL MOREY

BY
J. Warren Kinney Jr.
ATTORNEY

Patented Dec. 14, 1971

INVENTOR
CARL MOREY

BY
J. Warren Kinney Jr.
ATTORNEY

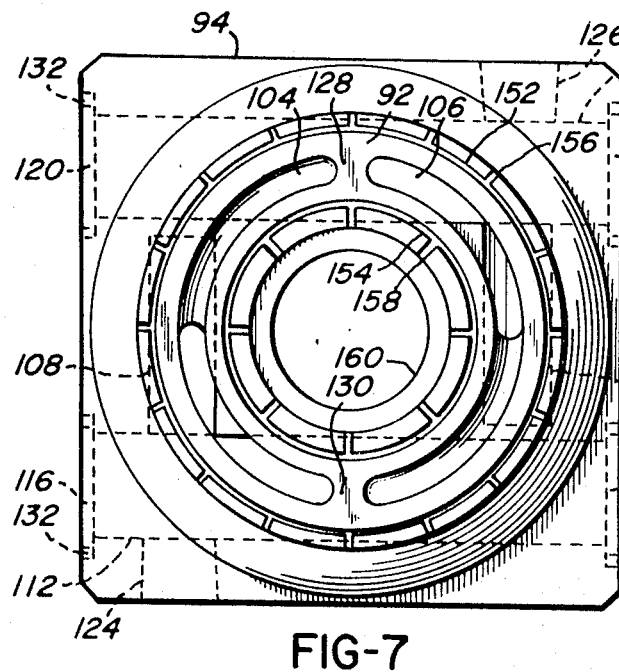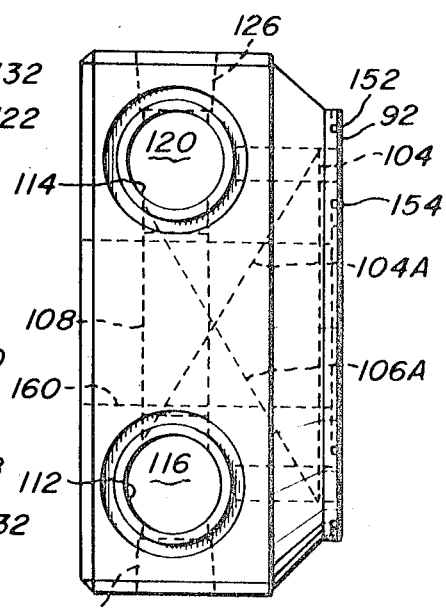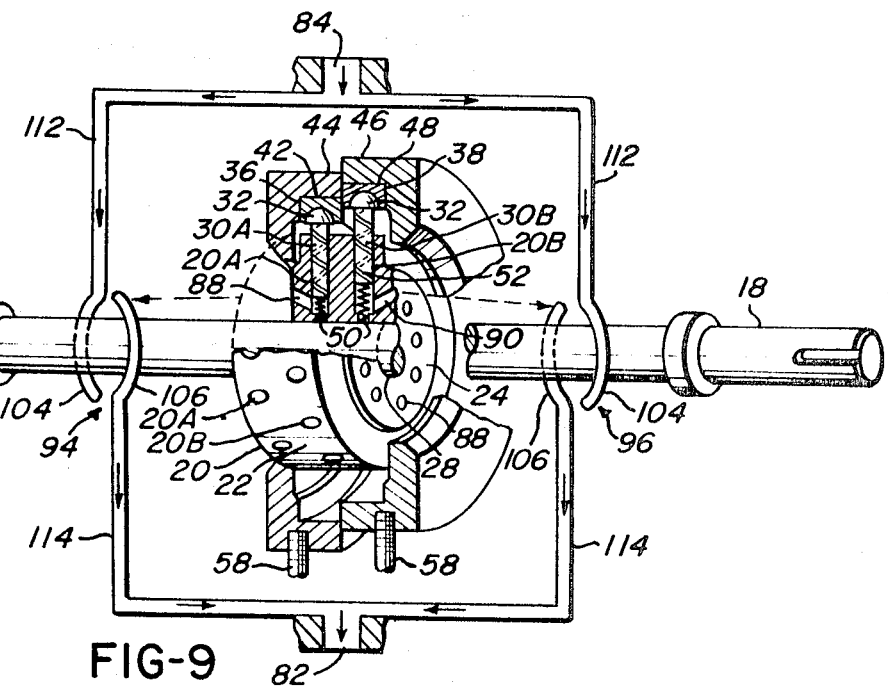

VARIABLE REVERSIBLE PISTON PUMP

The present invention relates to a variable reversible piston pump, which embodies also the features of positive displacement of fluid and a radial disposition of multiple pistons upon a rotor movable within a sealed housing. The pump is a power pump having a main shaft drivable by a motor, usually in in one direction and at a constant speed, for delivering pressured fluid to a machine such as, for example, a double-acting hydraulic cylinder, the ram of which is to be driven at variable rates of speed and in opposite directions. Other uses for the pump will become manifest as the description proceeds.

The pump of this invention is especially useful in situations which require noiseless operation and freedom from vibration.

Pumps of the general character herein disclosed have enjoyed only a limited acceptance in the past, due to their vulnerability to comparative rapid wear of numerous sometimes delicate parts, some of which were reciprocative and incapable of being well balanced in operation. Such pumps were usually of complex and expensive construction, and required frequent maintenance attention. They also generated frictional heat and developed fluid leaks to an undesirable extent, with resultant loss of efficiency, reliability, and effective performance.

The pump of the present invention eliminates the objections above noted, as well as others of more or less importance, which are well known to persons skilled in the art or conversant with such machines.

An object of the present invention is to provide various structural improvements in a pump of the type mentioned, which will reduce very materially the number of moving parts employed, the complexity and cost of such parts, and the expense of manufacture and assembly of the pump.

Another object of the invention is to provide a pump of the character stated, which is extremely rugged, is highly efficient, practically noiseless and vibrationless in its operation, and which requires a minimum of maintenance attention.

A further object of the invention is to provide in a pump of the type mentioned, means for attaining high-speed, high-volume fluid delivery, with practically imperceptible high-frequency hydraulic pulsation, the pumping reaction loads being balanced for the benefit of great mechanical efficiency and noiseless vibrationless operation.

A still further object is to avoid the employment of any reciprocable unbalanceable moving parts of substantial weight or mass, which might generate vibrations, noise, and rapid wear of parts within the pump.

Another object is to provide in a pump of the character stated, hydraulic means for facilitating actuation of the pump controls which regulate the direction, volume and pressure of fluid delivery of the pump.

The foregoing and other objects are attained by the means described herein and illustrated upon the accompanying drawings, in which:

FIG. 7 is a face view of a valve block constituting an element of the pump.

FIG. 8 is an end view of the valve block of FIG. 7.

FIG. 9 is a diagrammatic view showing the principle of operation of the pump.

Figure 1:
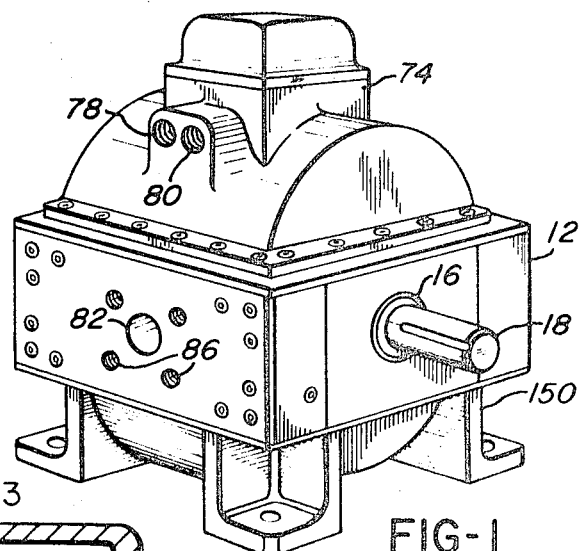
FIG. 1 is a perspective view of the improved pump of the present invention.

In the drawings, 12 denotes generally a housing which includes bearings 14 and sealing elements 16 in which are rotatably supported a main shaft 18. Upon the shaft is keyed or otherwise fixed a cylindrical rotor 20 of considerable thickness, having a peripheral face 22 concentric with the shaft axis. The rotor is provided with a multiplicity of substantially radial cylindrical bores, which will hereinafter be referred to as cylinders. The cylinders 20A and 20B are in two rows, the axes of the cylinders 20A being in a plane perpendicular to the axis of shaft 18, and the axes of cylinders 20B being in a second plane perpendicular to said shaft axis.

Figure 5:
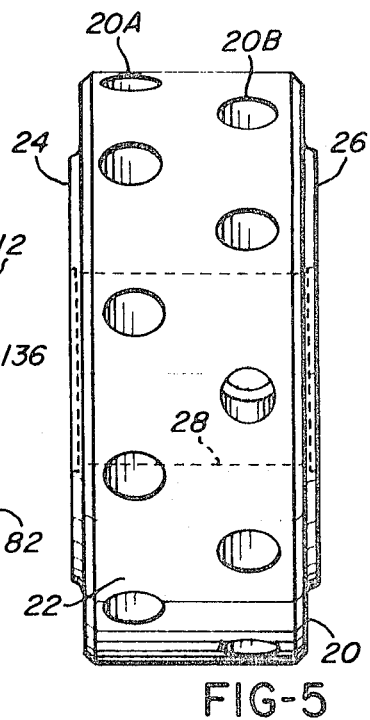
FIG. 5 is a side elevation of the rotor.

The cylinders in each row should be substantially equally spaced from one another, and each row should contain an odd number of cylinders, such as 11 for example. From FIG. 5, it is apparent that the cylinders of one row are equally staggered, or offset, relative to the cylinders of the other row. The rotor has opposite smooth faces 24 and 26, which preferably are flat, and located in parallel planes. The bore 28 of the rotor drivingly receives shaft 18, which is to be rotated by means of any suitable motor, not shown. The driving motor conveniently may rotate the shaft 18 in one direction, and at a constant rate of speed; however, the pump may be operated satisfactorily with the use of a drive motor otherwise characterized, if desired. For convenience of explanation, it may be assumed that pump shaft 18 will be driven unidirectionally at a constant speed.

Within each of the cylinders 20A and 20B is located a piston 30A or 30B, which pistons are reciprocable within their respective cylinders. Each piston has a rounded or substantially hemispherical head 32 at the outer end thereof. The heads of the pistons are rockingly supported in the hemispherical sockets 34, 34 of the slipper elements 36 and 38, which slipper elements comprise, each, a metallic block having an arcuate bearing surface 39 (FIG. 3), an inclined leading face 40, and an oppositely sloping or inclined tailing face 42. The slipper elements may properly be considered cam followers rockingly applied to the outer headed ends of the pistons.

The slipper elements of pistons 30A are adapted to slide along the inner bearing surface or circular track 42 of cam member or eccentric ring 44, which is supported nonrotationally within housing 12. A second identical cam member or eccentric ring 46 similarly supported, includes an inner bearing surface or circular track 48 upon which may slide the metallic slipper elements of the pistons 30B. The slipper elements and the tracks upon which they slide are well lubricated, as will be explained.

The slipper elements 36 and 38 may be maintained in contact with their respective cam tracks in any suitable manner, as by means of compression springs 50, 50 acting against the inner ends of the pistons 30A and 30B. The outer cylindrical surfaces of the pistons may be provided each with a shallow helical groove 52, the purpose of which is to carry lubricant to the inside surfaces of the cylinders in which the pistons reciprocate, without materially depreciating the pumping function of the pistons. Housing 12, preferably is filled with a pressure fluid lubricant.

Figure 3:
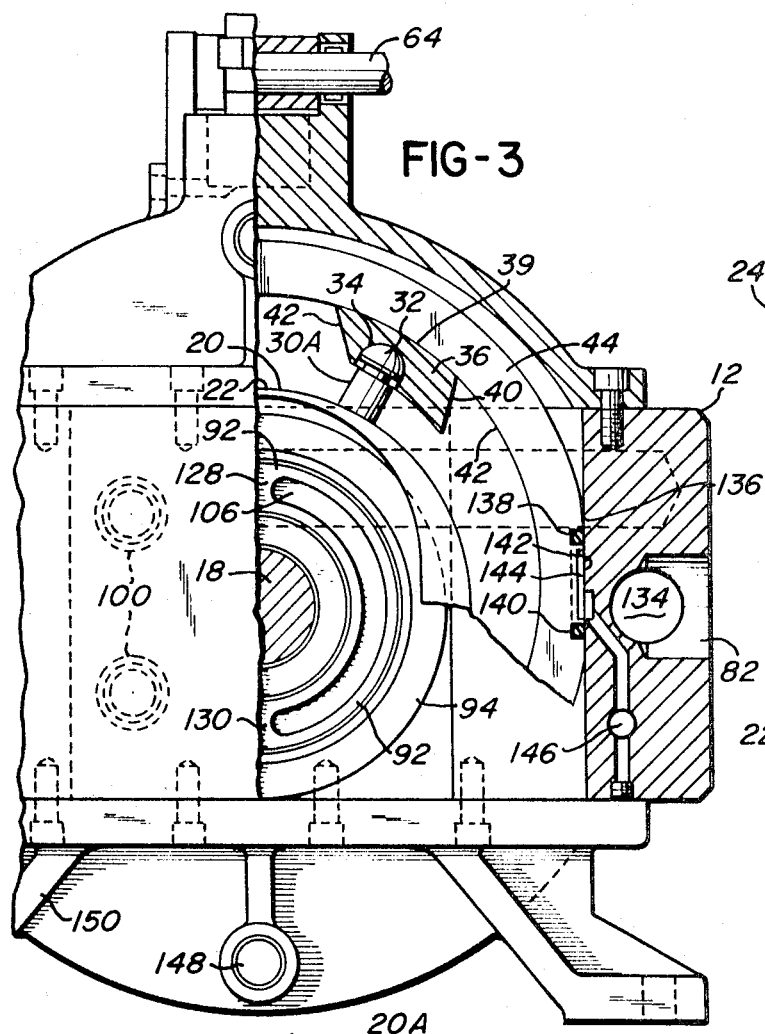
FIG. 3 is a transverse cross section taken on line 3—3 of FIG. 2, certain parts being shown in elevation.

With reference to FIG. 3, it is noted that rotor 20 rotates clockwise, carrying with it all the pistons 30A and 30B, with their slipper elements 36 and 38. Moving clockwise, the slipper element 36 of FIG. 3 advances along circular track 42, with the inclined leading face 40 acting to compact fluid lubricant against the track and between the track and the slipper element, thereby to maintain a film of lubricant between the parts in the interests of minimizing wear and frictional drag. Liquid lubricant may fill the entire housing 12, so that the rotor and all parts carried thereby run in liquid lubricant. The housing preferably is sealed against loss of lubricant, and an auxiliary pump or other suitable means, not shown, may be employed to maintain said lubricant under low pressure within the housing.

The eccentric rings or cam members 44 and 46 may be generally circular in form, and each is supported nonrotatably within housing 12 for shiftability bodily in opposite directions radially of main shaft 18. In the example illustrated by FIG. 2, the eccentric ring 44 is shown shifted toward the top of the figure, from a neutral position of concentricity with shaft 18, whereas the other ring 46 is shown shifted toward the base of the figure, from the neutral position of concentricity. The farther the concentric rings are displaced from the neutral position, the greater will be the throw or radial travel of pistons 30A and 30B during rotation of the rotor 20, as will be understood. And of course, the capacity of a piston to pump and move a fluid through its supporting cylinder, will be dependent upon the throw or radial travel of the piston.

Figure 2:
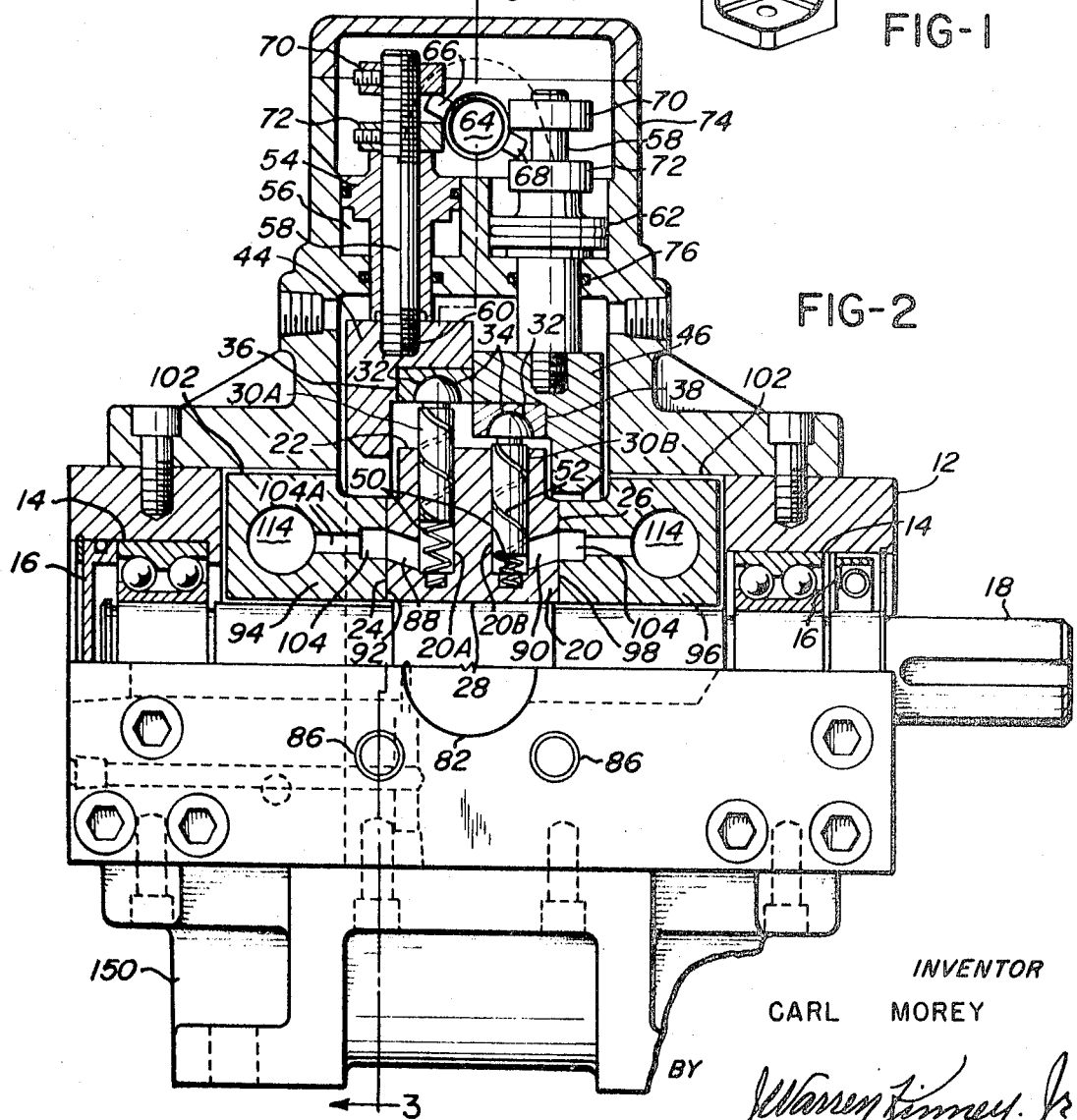
FIG. 2 is an enlarged cross section taken on a vertical plane including the axis of the pump shaft.

The eccentric rings or cam members 44 and 46 may be bodily shifted, and held in any shifted position, by the use of any appropriate means. In the example of FIGS. 1, 2 and 3, this adjustability is shown effected by hydraulic means under the control of an operator. Such means may comprise a piston 54 working in a cylinder 56, to hydraulically advance or retract a connecting rod 58 secured at 60 to the eccentric ring or cam member 44. In like manner, a second piston 62 may bodily shift the eccentric ring or cam member 46, in a direction of movement directly opposite to that of ring 44. That is, piston 54 will move cam member 44 upwardly, while piston 62 moves cam member 46 downwardly, and vice versa, the movements of the cam members being equal linearly, but in opposite directions, from a neutral position at which the tracks of both cam members are concentric with the axis of shaft 18, and with each other.

The aforesaid shifting of the cam members or rings 44 and 46 may be effected by means other than hydraulic means, if desired, such as by means of a rockable control shaft 64, FIG. 2, carrying a pair of diametrically opposed fixed studs 66 and 68 engaging upper and lower spaced collars 70 and 72 secured upon the connecting rods of pistons 54 and 62. By rocking the shaft in one direction or the other, the eccentric rings or cam members will be shifted in opposite directions as before stated, to vary the effective stroke of each piston carried by rotor 20. As will be understood, the effective stroke of each rotor piston will be reduced to zero whenever the circular tracks of both cam members are concentric with shaft 18.

Leakage of fluid between the interior of control box 74 and the interior of housing 12, may be precluded by means of suitable seals 76 (FIG. 2) surrounding the piston rods which actuate the eccentric rings or cam members 44 and 46. On FIG. 1, the ports 78 and 80 provide for the necessary fluid connections for hydraulically activating the control pistons 54 and 62, whenever the output rate of the pump is to be altered, or its direction of flow reversed, as will be more fully explained.

One main port of the housing 12 is shown at 82 upon FIGS. 1, 2, 3 and 9, this being located at one end of the housing. A second main port is located at the opposite end of the housing, and appears at 84 only upon FIG. 9. Either of these ports may perform as an intake or as an output port, depending upon the relative positions of adjustment of the eccentric rings or cam members 44, 46. The main ports may be surrounded by drilled and tapped holes 86, whereby suitable hose or pipe fittings may be applied for conveying fluid pressured by the pump, to and from a mechanism to be actuated, for example, a double-acting hydraulic cylinder or ram (not shown), for performing work.

Figure 4:
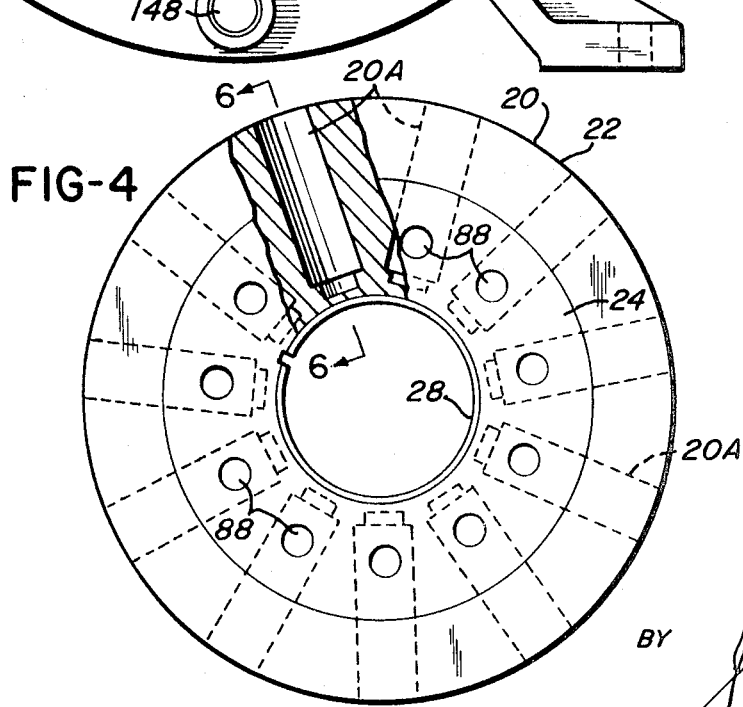
FIG. 4 is a plan view of a rotor, partly broken away.
Figure 6:
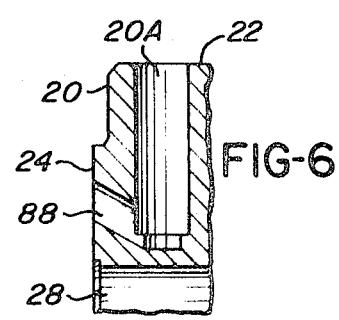
FIG. 6 is a fragmental cross section taken on line 6—6 of FIG. 4.

It is important to note that each of the 20A cylinders has a lateral port 88 exposed at the end face 24 of rotor 20, whereas each of the 20B cylinders has a lateral port 90 exposed at the opposite end face 26 of the rotor. These ports 88 and 90 are located near the bottom of the cylinders, and serve to convey hydraulic fluid to and from the cylinders. The opposite end faces of the rotor, with their cylinder ports 88 or 90, will present the appearance of FIG. 4. The cylinder ports of each bank of cylinders, will be arranged in a circle within the limits of the smooth flat faces 24 and 26 at the opposite ends of the rotor, according to FIG. 4. That is, the number of ports 88 is equal to the number of cylinders 20A, and the number of ports 90 is equal to the number of cylinders 20B. All ports 88 are substantially equally spaced from one another, as are also the ports 90. All of the cylinder ports are located equidistant from the axis of shaft 18.

The smooth end faces 24 of the rotor flatly abut an end face 92 of a valve block or valving member 94, whereas face 26 flatly abuts an end face 98 of a second valve block or valving member 96. Valving members or blocks 94 and 96 are nonrotatable, and their end faces 92 and 98 are yieldingly pressed against the rotor 20 at the opposite end faces of the latter, with a nice running fit or bearing abutment. Pressing of the valving members against the rotor may be effected in any suitable manner, as by means of pressure buttons 100 (FIG. 3), carried by the housing, or by other means such as springs or hydraulic force properly applied. The valving members or blocks may be rectangular of contour generally, according to FIGS. 7 and 8, and may be fitted into rectangular recesses 102, 102, provided interiorly of housing 12. As before noted, the valving members or blocks 94 and 96 are nonrotatable within the housing and its recesses 102, 102.

Since the valving members 94 and 96 are practically identical of construction, a description of one will suffice for the other also. Valving member 94 is described as a thick metallic block characterized by the smooth bearing face 92 in which are formed the arcuate fluid-conductive slots 104, 106, which slots are spaced from the axis of shaft 18 a distance equal to the spacing of the cylinder ports 88 and 90 from said shaft axis. Thus, the slots may conduct fluid to and from the ports 88 and 90 as rotor 20 rotates.

Arcuate slot 104 is in communication with a collector chamber 108 formed in the valving member or block, whereas slot 106 is in communication with a second and separate collector chamber 110. In turn, chamber 108 is in fluid communication with a cross-passage 112, and chamber 110 is in fluid communication with a second cross-passage 114.

Cross-passage 112 has opposed open ends 116 and 118, and cross-passage 114 has opposed open ends 120 and 122. The reference numerals 124 and 126 indicate plugs for the bores 108 and 110, which intersect the passageways 112 and 114, respectively.

From the foregoing, it will be understood that a fluid can enter either end of passageway 112, then pass to slot 104 by way of chamber 108, and from slot 104 it may be distributed to those cylinder ports 88 which may be in registry with slot 104. Also, said fluid may sometimes flow in opposite direction, from the cylinder ports to passageway 112. Similarly, fluid may flow from passageway 114, through 110, and slot 106, to enter such cylinder ports 90 as may be in registry with slot 106, or the flow may be in the opposite direction.

The foregoing is best illustrated upon the diagrammatic view of FIG. 9, wherein fluid is seen to enter the main housing port 84, whence the flow is divided to enter corresponding arcuate slots 104, 104 of valving members 94 and 96. From these slots 104, 104, the fluid enters the piston chambers 20B on the out-stroke or suction stroke of the pistons 30B; and thereafter, during the compression stroke of said pistons, the flow of fluid will be in reverse through those cylinder ports which happen to be in registry with the arcuate slots 106, 106, for delivery to and through main housing port 82.

The action of the pistons 30A in cylinders 20A is the same as above explained, to augment the flow of fluid in a common direction toward one main housing port and from the other. To reverse the flow of fluid through the main housing ports 82 and 84, the operator need only shift the eccentric rings 44 and 46 by means of the rods 58, 58, to positions at which the pistons 30B shown in FIG. 9 are depressed, while pistons 30A are outwardly extended. Should the eccentric rings be shifted to exact concentricity of their cam tracks with one another, no fluid flow through the ports 82 and 84 would occur, because in such a position of the eccentrics, the pistons would be inactive as to linear movement radially of the rotor.

It should be noted that the arcuate slots 104 and 106 (FIG. 7), are nearly of half-circle extent, and the opposite ends of one slot terminate near but spaced from the opposite ends of the other slot. Thus, at the locations 128 and 130, the slot ends are separated. The extent of slot separation between 128 and 130 is equal to the minor diameter of the cylinder ports, whereas the width of each of slots 104 and 106 are equal to the major diameter of said cylinder ports.

The valving members and their arcuate collecting slots are so related to the rotor and the eccentric rings, that whenever a cylinder port of the rotor is blocked by a dead space such as 128 or 130 of the valving member, the piston associated with that particular cylinder port will be either fully extended or fully retracted. Accordingly, such piston will not be working at that instant, so the blocking of its port is of no consequence although some of the reaming pistons are at work to generate positive fluid pressure in one arcuate slot of the valving member while at the same time other pistons are at work to generate a negative pressure of fluid in the other arcuate slot of the same valving member.

As the rotor rotates, its cylinder ports pass successively from one arcuate fluid collecting slot to the other similar slot of the same valving member, thereby to effect a substantially continuous flow of fluid in both arcuate slots, but in opposite directions, said flow passing through the main housing ports 82 and 84 to and from a fluid-operated machine connected with said ports 82 and 84. Reversal of the flow, when required, is effected by shifting the cam members or eccentric rings as previously noted.

On FIG. 8, the oblique broken line 104A indicates the gradually inclined bottom wall of arcuate slot 104; and 106A indicates the bottom wall of arcuate slot 106 also inclined. The opposite ends of passageways 112 and 114 are seen to be counterbored to a shallow depth. These counterbores are adapted to receive resilient gasket rings, denoted 132 on FIG. 7, for effecting leakproof joints with passageways in the pump housing connecting the passageways 112 and 114 with the main housing ports 82 and 84. One such pump housing passageway is indicated at 134 upon FIG. 3.

Means is provided for facilitating shifting of the eccentric rings or cam members 44 and 46 which regulate the output rate of the pump. Such means, as shown by FIG. 3, consists in forming a flat face 136 of limited area upon the outer peripheral edge of ring 44, where the ring slides upon the flat inner wall area of the housing. The flat face 136 is provided with a circular groove 138 in which rests ring-shaped resilient gasket or O-ring 140. The gasket or ring slidingly contacts the flat inner wall area 144 of housing 12.

Within the confines of gasket or ring 140, the face 136 is provided with a shallow well 142 to receive fluid under pressure, which, being confined by the ring, and acting against the adjacent flat wall area 144 of housing 12, urges the cam member 44 bodily away from said wall area 144. This, of course, reduces the frictional contact between the cam member and the housing inner wall at 144, thereby facilitating bodily shifting of the cam member 44 toward and from the control shaft 64.

Pressure of fluid utilized in pressurizing the well 142, is shunted from a passageway 146, which has connection with passageway 134 and port 82. The force acting to urge the cam member 44 away from wall 144, substantially counterbalances the force exerted by the pistons 30A upon cam member 44 tending to press the cam member against housing wall 144, so that frictional drag of the cam member upon wall 144 is neglegible in shifting the cam member to adjusted positions.

It is pointed out that the means above described for facilitating shifting of the eccentric ring or cam member 44, is to be duplicated at a diametrically opposite location upon member 44, said duplicated means being effective to hydraulically facilitate the shifting when the cam members are shifted to reverse the flow of fluid through the housing ports 82 and 84. The eccentric ring or cam member 46 is to be similarly hydraulically balanced at opposite ends of a diameter, for like purpose. The hydraulic means described works counter to the forces imposed upon the cam members by the pistons when under compression, tending to laterally displace the cam members against the housing inner walls.

It will be understood from the foregoing, that the hydraulic means 142, of which four are provided, two being associated with each cam member, will receive their activating hydraulic force from one or the other of the fluid passageways charged with fluid under high pressure by the compressive action of the pistons 30A and 30B as rotor 20 rotates, provided of course, that the cam member tracks are not in a neutral or relatively concentric relationship. Otherwise stated, the hydraulic means at opposite extremities of each cam member, will act to substantially counterbalance the force of all pistons under compression tending to throw the cam members laterally against an inner wall such as 144 of the housing, so that the cam members quite easily may be shifted to adjusted positions through the agency of rods 58, 58.

Earlier herein it was pointed out that housing 12 is filled with a fluid lubricant under pressure. It must be understood that this body of lubricant is under low pressure, provided preferably by a small auxiliary pump, not shown, supplying lubricant to the interior of the housing. The pressure of fluid found within the piston chambers, the interior passageways of the valve blocks, and in main ports 82, 84 may reach a value in excess of several thousand p.s.i., while the pump is operating. The circuit for this high pressure fluid is plainly indicated upon FIG. 9. Upon FIG. 3, the numeral 148 indicates a drain plug for the low-pressure fluid of housing 12, said plug being located in the hollow base section 150 of the housing.

By reason of the balanced arrangement of all its constituents, the pump operates noiselessly and without vibration to supply very high pressure fluid for operating other machinery, or for other purposes. The arrangement of pistons in the banks of cylinders of rotor 20 is such that there is always a piston moving radially inwardly while another located almost diametrically opposite thereto is moving radially outwardly, thereby to maintain a weight balance in all operating positions of the rotor. The use of a rotor having a multiplicity of pistons in plural banks, with the pistons of one bank offset from those of the other bank, practically eliminates pulsing of delivered fluid, this advantage being further enhanced by the ability of the valving member slots 104, 106, to collect and release fluid throughout practically a 360° rotation of the rotor. The number of cylinders employed, and the number of banks in which the cylinders are arranged, may be varied as desired.

The construction herein disclosed includes no unbalanced reciprocative parts, and all elements of the pump with the exception of the rotor and its pistons are normally stationary and therefore subject to little if any wear. The use of face valves such as 94 and 96 having large orifices, rather than pintle-type valves, ensures trouble-free operation of the pump.

Due to the balanced condition of weights and forces achieved by the structural improvements disclosed herein, the main shaft bearing loads have been determined to approximate only about 20 percent of the reaction load at normal operating speed of the pump.

Several points relating to additional structural advantage may be noted here. One such concerns the piston construction 30A or 30B, wherein the length and stroke of the piston are so related that half the length of the piston remains within its cylinder when the piston is at its maximal outer limit of extension. Also, the effective length of the piston should closely approximate twice the diametral dimension thereof.

Further, as illustrated by FIGS. 7 and 8, the bearing face 92 of the valving member advantageously may be annularly grooved continuously as at 152 and 154, with both arcuate collecting slots 104 and 106 located between the annular grooves as shown. At a multiplicity of equally spaced locations, short shallow grooves 156 may radiate outwardly from the annular groove 152; similar short shallow grooves 158 equally spaced apart radiate inwardly from annular groove 156 toward the shaft-receiving bore 160 of the valving member. As will be understood, both of the valving members 94 and 96 may be thusly constructed. The arrangement of annular and radial grooves so applied to the valving members provides for superior bearing area lubrication at the side faces 24 and 26 of the rotor, without loss of high pressure fluid into the housing chamber exteriorly of the valving members.

It will be understood that each of the two valve blocks are free to float axially relative to the rotor. According to the teaching of the present invention, pressure is continuously applied to the valve blocks by those of the pressure ports 100 and 142 which at the time are subjected to the continuous discharge pressure developed by the pump. The pressure ports are proportioned so that they will exert a force sufficiently greater than the separating force at the valve face to maintain a seal between the rotor and each of the valve blocks. Certain of the pressure ports are connected to the suction lines whereas other of the pressure ports are connected to the discharge lines; however, only those connected to the discharge lines are subjected to pressure of the discharge line wherefore the sealing force only effects the discharge ports. However, in the event of reversal of flow, those of the pressure ports which were originally in communication with the discharge line, will be connected to the suction lines and those ports originally connected to the suction lines will be connected to the discharge lines.

The pressure applied to each of the valve blocks via those of the pressure ports which at the time are connected to the discharge line will produce and actually maintain contact between the adjacent faces of the valve blocks and rotor.

In the preferred embodiment of the invention springs, not illustrated, are utilized in conjunction with the pressure ports for the purpose of maintaining the valve blocks in contact with the rotor at start up when no discharge pressure is available for that purpose.

To summarize, it will be noted that the subject pump has suction and discharge through 360° rotation since it consists of two pumping elements, each having a suction and discharge through 180° rotation. The two pumping elements are constructed in such a manner that they work in opposition so that their relative ports are cross-connected to the main suction and discharge lines thereby creating and maintaining suction and discharge through 360°.

What is claimed is:

1. A fluid pump comprising in combination: a stationary housing having flow passages and an inlet and an outlet port; a driveable main shaft supported upon said housing for rotation; a rotor mounted upon said shaft for rotation therewith interiorly of the housing, said rotor having formed therein a plurality of approximately radially disposed piston-receptive cylinders each having an open outer end and an inner ported end; a piston movable axially in each of said cylinders; normally stationary cam means operative upon each of said pistons to reciprocate said pistons within their respective cylinders incident to rotation of the rotor, for moving hydraulic fluid through the inner end ports of the cylinders; valving means providing fluid communication between the inner end ports of the cylinders and the flow passages and ports of the housing, to effect intake of fluid through the inlet port of the housing, and delivery of fluid through the outlet port thereof, incident to rotation of the rotor; said aforesaid cam means comprising a nonrotatable ring having an internal substantially circular cam track surrounding the rotor perimeter; means supporting said ring within the housing for selective shifting movement of said ring perpendicularly of the main shaft, to predetermined degrees of eccentricity of said track to said rotor perimeter; follower means on each piston disposed in riding relationship upon the track of the cam ring; and hydraulic means in fluid communication with the cam ring and operative to minimize the force required to shift the cam ring resulting from the pump reaction forces.

2. The pump as defined by claim 1, wherein the combination includes means to disable operation of said cam means upon the pistons, with resultant termination of fluid flow through the cylinders and said housing ports, notwithstanding continued rotation of the rotor.

3. The pump as defined by claim 1, wherein the housing of the pump includes means for sealing said housing against leakage of hydraulic fluid therefrom; and means for maintaining said fluid under pressure.

4. The pump as defined by claim 1, wherein said follower means comprises a rounded head extending radially outwardly from each piston beyond the perimeter of the rotor; and a slipper element interposed between the cam track and each piston head, said slipper elements each having a socket rockingly accommodating a rounded head of a piston, and a bearing surface in contact with the cam track; and means constantly maintaining said bearing surfaces of the slipper elements in abutment with the cam track.

5. The pump as defined by claim 4, wherein the housing is sealed to retain a quantity of hydraulic fluid; and each slipper element is provided with means to forcefully project a portion of said fluid between the cam track and said bearing surfaces of the slipper element during movement of the rotor.

6. The pump as defined by claim 5, wherein is provided means for maintaining under compression the hydraulic fluid retained by the housing.

7. The pump as defined by claim 1, wherein the pressure employed to actuate the hydraulic means last mentioned, is diverted from a flow passage of the pump housing pressured by the piston movements.

8. The pump as defined by claim 1, wherein said valving means includes a valve block having arcuate fluid-conductive slots disposed alongside the rotor to communicate with the inner end ports of the cylinders aforesaid.

9. The pump as defined by claim 8, wherein is included yielding means for maintaining the valve blocks in fluid sealing contact against the opposite sides of the rotor.

10. The pump as defined by claim 8, wherein the piston-receptive cylinders are disposed in two adjacent rows within the rotor, the valve block is duplicated at opposite sides of the rotor, and the arcuate fluid-conductive slots of one valve block cooperates with the cylinders of fluid-conductive slot of one valve block cooperates with the cylinders of one row thereof, whereas the arcuate fluid-conductive slot of the remaining valve block cooperates with the cylinders of the remaining row of cylinders, to convey fluid to and from the cylinders through the inner end ports thereof.

11. The pump as defined by claim 10, wherein the aforesaid cam means comprises a pair of parallel nonrotatable rings each surrounding the rotor perimeter, such rings each being coplanar with one of the rows of cylinders aforesaid; means within the housing supporting each ring for shifting movement perpendicularly of the main shaft, to predetermined degrees of eccentricity of said tracks to said rotor perimeter; and follower means on the pistons of each row of pistons, to ride upon the racks of those cam rings which are coplanar with a row of cylinders.

12. The pump as defined by claim 11, wherein the cylinders of each row are uneven in number, approximating 11.

13. The pump as defined by claim 12, wherein the cylinders of one row are offset or staggered relative to the cylinders of the remaining row.

14. The pump as defined by claim 11, wherein each follower means comprises a rounded head extending outwardly from a piston beyond the perimeter of the rotor; and a slipper element interposed between the cam track and the piston head of each row of pistons, said slipper element each having a socket rockingly accommodating a rounded head of a piston, and a bearing surface in contact with the cam track; and means constantly maintaining said bearing surfaces of the slipper elements in contact with their respective cam tracks.

15. The pump as defined by claim 14, wherein the housing is sealed to retain a quantity of hydraulic fluid.

16. The pump as defined by claim 15, wherein is provided means for maintaining under compression the hydraulic fluid retained by the housing.

17. The pump as defined by claim 16, wherein the pressure employed to actuate the hydraulic means in fluid communication with the cam rings is diverted from a flow passage of the housing pressured by the piston movements.

18. The pump as defined by claim 11, wherein the combination includes means for shifting said cam rings simultaneously through equal linear distances but in diametrically opposite directions, to vary the output flow of the pump.

19. The pump as defined by claim 18, wherein the combination includes power means for so shifting said cam rings.

20. The pump as defined by claim 18, wherein the cam rings are movable into substantially exact concentricity of their cam tracks one with the other, to neutralize the output flow of the pump.

21. The pump as defined in claim 18, wherein the cam rings are movable relative to their respective cam tracks whereby to reverse the output flow of the pump.

22. The pump as defined by claim 10, wherein is included yielding means for maintaining the valve blocks in fluid sealing contact against the opposite sides of the rotor.

23. The pump as defined by claim 22, wherein the housing is sealed to retain a quantity of hydraulic fluid maintained under pressure therein.

24. The pump as defined by claim 23, wherein said yielding means includes means to apply hydraulic force to the valve blocks longitudinally of the main shaft axis and toward the rotor.

25. The pump as defined by claim 10, wherein the cylinders of each row are uneven in number, approximating 11.

26. The pump as defined by claim 25, wherein the cylinders of one row are offset or staggered relative to the cylinders of the remaining row.

27. A variable displacement, reversible flow, positive displacement power pump, comprising in combination: a rotor; a hollow housing confining said rotor; and means for rotating said rotor; said rotor having formed therein a row of substantially coplanar spaced piston-receptive cylinders each extending substantially radially from the axis of rotation of the rotor; a piston movable axially in each of said cylinders; means including a normally stationary cam operative to advance in progression about half of the pistons of the row on a compression stroke, and to retract the remaining pistons thereof on a suction stroke, with each half-rotation of the rotor; means for conveying a hydraulic fluid to those pistons which are on suction stroke, and relieving fluid from those pistons which are on compression stroke; means supporting said cam for selective shifting movement of said cam relative to said pistons; and hydraulic means in fluid communication with said cam and operative to minimize the force required to shift said cam.

28. The pump as defined by claim 27, wherein the housing is provided with passage means to deliver externally of the housing such fluid as is expelled by the pistons on compression stroke, and to supply compensating fluid to those pistons which are on suction stroke.

29. The pump as defined by claim 27 wherein suction and discharge occur through 360° rotation of said rotor.

30. The pump as defined by claim 27, wherein the means for conveying and relieving fluid from the pistons includes at least one substantially immovable valving member fixed against rotation relative to the housing.

31. The pump as defined by claim 30, wherein a hydraulic fluid under pressure is retained within the housing to envelop the cam and the valving member aforesaid.

* * * * *